United States Patent
Woodworth et al.

(10) Patent No.: US 6,441,066 B1
(45) Date of Patent: Aug. 27, 2002

(54) PIGMENT DISPERSIONS CONTAINING DISPERSANTS PREPARED BY CONTROLLED RADICAL POLYMERIZATION AND HAVING PENDENT HYDROPHOBIC POLYMERIC SEGMENTS

(75) Inventors: Brian E. Woodworth, Mars; Simion Coca, Pittsburgh; James B. O'Dwyer, Valencia, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/464,914

(22) Filed: Dec. 16, 1999

(51) Int. Cl.⁷ .............................. C08K 5/48; C08K 3/00
(52) U.S. Cl. .................. 524/88; 524/495; 524/589; 524/590; 524/591; 524/601; 524/612
(58) Field of Search .................... 524/88, 495, 589, 524/590, 591, 601, 612

(56) References Cited

U.S. PATENT DOCUMENTS

| | | | |
|---|---|---|---|
| 4,508,880 A | 4/1985 | Webster | 526/190 |
| 4,656,226 A | 4/1987 | Hutchins et al. | 525/93 |
| 4,755,563 A | 7/1988 | West | 525/287 |
| 4,812,517 A | 3/1989 | West | 525/94 |
| 5,085,698 A | 2/1992 | Ma et al. | 106/20 |
| 5,219,945 A | 6/1993 | Dicker et al. | 525/276 |
| 5,221,334 A | 6/1993 | Ma et al. | 106/20 D |
| 5,272,201 A | 12/1993 | Ma et al. | 524/505 |
| 5,478,886 A | 12/1995 | Kim | 525/94 |
| 5,763,548 A | 6/1998 | Matyjaszewski et al. | 526/135 |
| 5,789,487 A | 8/1998 | Matyjaszewski et al. | 525/301 |
| 5,807,937 A | 9/1998 | Matyjaszewski | 526/135 |
| 5,859,113 A | 1/1999 | McIntyre et al. | 524/460 |

FOREIGN PATENT DOCUMENTS

| | | |
|---|---|---|
| WO | WO 96/30421 | 10/1996 |
| WO | WO 97/18247 | 5/1997 |
| WO | WO 98/01480 | 1/1998 |
| WO | WO 98/40415 | 9/1998 |

*Primary Examiner*—Edward J. Cain
(74) *Attorney, Agent, or Firm*—William J. Uhl; James R. Franks

(57) ABSTRACT

A pigment dispersion comprising pigment, an aqueous carrier selected from water and a mixture of water and at least one organic solvent, and a pigment dispersant is described. The pigment dispersant is prepared by controlled radical polymerization, e.g., atom transfer radical polymerization, of a radically polymerizable monomer in the presence of a polymeric initiator having at least one radically transferable group. The polymeric initiator forms the polymeric backbone segment of the pigment dispersant, and the monomer forms polymeric segments that are pendent to the polymeric backbone segment. The pigment dispersant has comb-like architecture in which the polymeric backbone segment is hydrophilic, and at least a portion of each pendent polymeric segment is hydrophobic.

25 Claims, 1 Drawing Sheet

PIGMENT DISPERSIONS CONTAINING DISPERSANTS PREPARED BY CONTROLLED RADICAL POLYMERIZATION AND HAVING PENDENT HYDROPHOBIC POLYMERIC SEGMENTS

FIELD OF THE INVENTION

The present invention relates to pigment dispersions containing pigment, an aqueous carrier, and a pigment dispersant prepared by the controlled radical polymerization of (i) at least one radically polymerizable ethylenically unsaturated first monomer in the presence of (ii) a polymeric initiator having at least one radically transferable group. The polymeric initiator forms the polymeric backbone segment of the pigment dispersant, and the first monomer forms polymeric segments pendent to the backbone of the dispersant. The polymeric backbone segment of the pigment dispersant is hydrophilic, and at least a portion of each pendent polymeric segment is hydrophobic.

BACKGROUND OF THE INVENTION

Pigmented coating compositions are used in a wide variety of applications including, for example, corrosion resistant primers and decorative topcoats in the automotive, industrial and appliance markets. The preparation of pigmented coating compositions generally involves mixing binder resin(s), crosslinker(s), additives, e.g., flow additives, and solvents with a compatible pigment dispersion. Pigment dispersions are typically prepared by mixing dry pigment with a pigment dispersant in the presence of a carrier medium, e.g., an aqueous carrier medium.

Dry pigments are available commercially in the form of agglomerated pigment particles. Pigment agglomerates are more likely to settle out of pigment dispersions and/or pigmented coating compositions, and are accordingly undesirable. To break the pigment agglomerates down into smaller agglomerates and/or individual particles generally requires the use of energy intensive mixing means (commonly referred to as grinding), e.g., sand mills and ball mills. During the grinding process the pigment agglomerates are broken down into smaller agglomerates and/or individual particles the surfaces of which are wetted by the pigment dispersant. The pigment dispersant suspends or disperses the pigment particles in the carrier medium and prevents their re-agglomeration on storage. It is desirable that the pigment dispersion remain substantially stable, e.g., showing minimal pigment settling and viscosity change with time, prior to its use in the preparation of a pigmented coating composition.

Reducing the environmental impact of pigmented coatings compositions, in particular that associated with emissions into the air of volatile organics during their use, has been an area of ongoing investigation and development in recent years. Accordingly, interest in aqueous pigment dispersions has been increasing due, in part, to the inherently low volatile organic content (VOC) of the aqueous pigmented coatings prepared therefrom, which can significantly reduce air emissions during the application process.

Pigment dispersants used in aqueous pigment dispersions are preferably compatible with both the aqueous carrier medium and the hydrophobic surfaces of the pigment particles. Such a combination of disparate properties can be achieved with a pigment dispersant having distinct hydrophobic and hydrophilic polymeric segments, i.e., having well defined polymer chain architecture. A wide variety of radically polymerizable monomers, such as methacrylate and acrylate monomers, are commercially available and can provide a wide range of properties including, for example, hydrophilic and hydrophobic properties. The use of conventional, i.e., non-living or free, radical polymerization methods to synthesize pigment dispersants provides little control over molecular weight, molecular weight distribution and, in particular, polymer chain structure. Aqueous pigment dispersions containing pigment dispersants prepared by conventional non-living radical polymerizations, typically have poor stability, e.g., the pigments re-agglomerate and/or settle out of the dispersion, and are unsuitable for the preparation of aqueous pigmented coatings compositions.

The continued development of aqueous pigment dispersions that are stable and suitable for the preparation of aqueous pigmented coating compositions is desirable. In particular, it would be desirable to develop aqueous pigment dispersions that comprise pigment dispersants having well defined polymer chain architecture in which distinct hydrophilic and hydrophobic polymer segments are present.

U.S. Pat. Nos. 5,807,937, 5,789,487 and 5,763,548, and International Patent Publication Nos. WO 98/40415, WO 98/01480, WO 97/18247 and WO 96/30421 describe a radical polymerization process referred to as atom transfer radical polymerization (ATRP). The ATRP process is described as being a living radical polymerization that results in the formation of (co)polymers having predictable molecular weight and molecular weight distribution. The ATRP process is also described as providing highly uniform products having controlled structure (i.e., controllable topology, composition, etc.). The '937 and '548 patents also describe (co)polymers prepared by ATRP, which are useful in a wide variety of applications including, for example, dispersants and surfactants.

SUMMARY OF THE INVENTION

In accordance with the present invention, there is provided a pigment dispersion comprising:

(a) pigment;

(b) an aqueous carrier selected from water and a mixture of water and at least one organic solvent; and (c) a pigment dispersant prepared by controlled radical polymerization of at least one radically polymerizable ethylenically unsaturated first monomer in the presence of a polymeric initiator having at least one radically transferable group, wherein said polymeric initiator forms a polymeric backbone segment, the first monomer forms polymeric segments pendent to said polymeric backbone segment, at least a portion of each pendent polymeric segment is hydrophobic, and said polymeric backbone segment is hydrophilic.

The features that characterize the present invention are pointed out with particularity in the claims which are annexed to and form a part of this disclosure. These and other features of the invention, its operating advantages and the specific objects obtained by its use will be more fully understood from the following detailed description and the accompanying drawings in which pigment dispersants useful in embodiments of the invention are illustrated and described.

Other than in the operating examples, or where otherwise indicated, all numbers or expressions referring to quantities of ingredients, reaction conditions, etc, used in the specification and claims are to be understood as modified in all instances by the term "about."

BRIEF DESCRIPTION OF THE DRAWINGS

In FIGS. 1 and 2 like reference numerals represent the same structural segments.

DETAILED DESCRIPTION OF THE INVENTION

Figure 1:
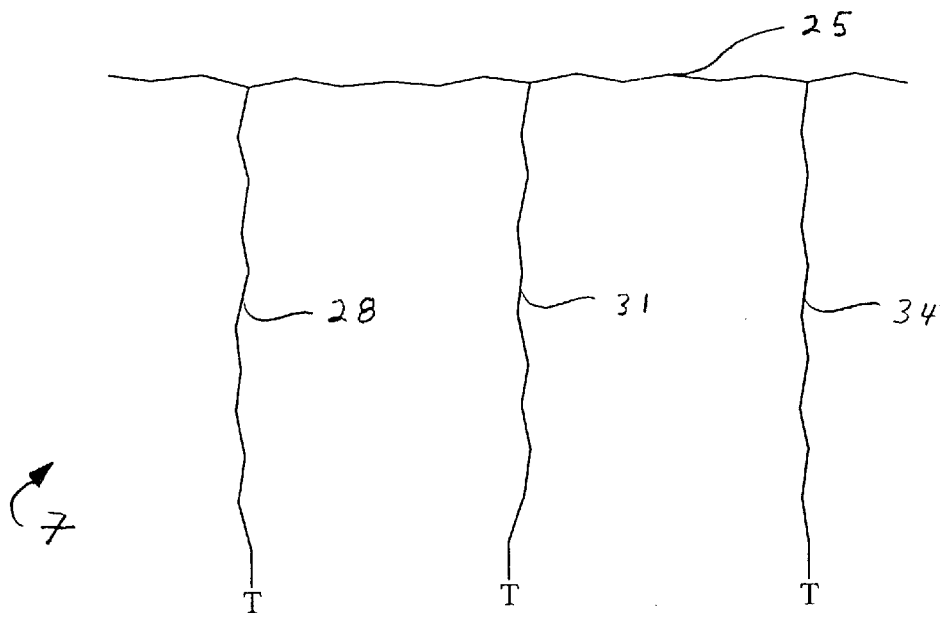
FIG. 1 is a diagrammatic representation of a pigment dispersant useful in the pigment dispersions of the present invention.

Pigment dispersions according to the present invention comprise one or more pigment dispersants which can be described generally as having a comb-like architecture, i.e., having a polymeric backbone segment with at least one polymer segment or tooth pendent therefrom. The polymeric backbone segment of the pigment dispersant is hydrophilic and at least a portion of each pendent polymeric segment is hydrophobic. Preferably, at least the terminal portion of each pendent polymeric segment, i.e., that portion which is furthest from the backbone, is hydrophobic. While not intending to be bound by any theory, it is believed that the hydrophobic teeth of the pigment dispersant are associated with the pigment, while the hydrophilic backbone is associated with the aqueous carrier of the pigment dispersion.

As used herein and in the claims, the terms "hydrophobic" and "hydrophilic" are relative to each other. The backbone segment of the pigment dispersant is hydrophilic, i.e., it is more hydrophilic than the pendent polymeric segments. Correspondingly, at least a portion of each pendent polymeric segment is hydrophobic, i.e., that portion is more hydrophobic than the backbone segment.

A more quantitative measure of the hydrophobic or hydrophilic nature of a nonionic monomer residue can be obtained by using the following Formula-A: 100×(oxygen weight+ nitrogen weight)/(carbon weight). Monomer residues having calculated Formula-A values of greater magnitude are generally considered to be more hydrophilic than monomer residues having calculated Formula-A values of lesser magnitude. For example, the calculated Formula-A value is 67 for 2-hydroxyethyl methacrylate; 63 for methacrylamide; 53 for methyl methacrylate; 33 for butyl methacrylate; and 22 for 2-ethylhexyl methacrylate. Accordingly, an average Formula-A value can be calculated for a polymer chain segment by averaging the calculated Formula-A values for the monomer residues within that segment. In an embodiment of the present invention, the hydrophilic polymeric backbone segment of the pigment dispersant has a calculated average Formula-A value of from 55 to 133, while the hydrophobic portion of each pendent polymeric segment has a calculated average Formula-A value of from 10 to less than 55, e.g., from 10 to 40 or from 10 to 33. The difference between the calculated Formula-A values of the hydrophilic polymeric backbone segment and the hydrophobic portion of each pendent polymeric segment is typically at least 10, e.g., at least 25, and typically within the range of 10 to 40, inclusive of the recited values.

The hydrophobic portion of each pendent polymeric segment of the pigment dispersant typically does not contain ionic monomer residues. The hydrophilic polymeric backbone segment of the pigment dispersant may contain ionic monomer residues, nonionic monomer residues (e.g., having calculated Formula-A values of from 55 to 133) or a combination of ionic and nonionic monomer residues.

Preparation of the pigment dispersant involves the controlled radical polymerization of at least one radically polymerizable ethylenically unsaturated first monomer in the presence of a polymeric initiator having at least one radically transferable group. The polymeric initiator forms the polymeric backbone segment of the pigment dispersant while the first monomer forms polymeric segments pendent from the backbone, i.e., the teeth of the comb-like pigment dispersant.

As used herein and in the claims, the term "controlled radical polymerization," and related terms, e.g., "living radical polymerization," refers to those methods of radical polymerization that provide control over the molecular weight, polymer chain architecture and polydispersity of the resulting polymer. A controlled or living radical polymerization is also described as a chain-growth polymerization that propagates with essentially no chain transfer and essentially no chain termination. The number of living polymer chains formed during a controlled radical polymerization is often nearly equal to the number of radically transferable groups (e.g., a multiple of the number of polymeric initiators and the number of radically transferable groups per polymeric initiator) present at the beginning of the reaction. Each living polymer chain typically contains a residue of the initiator at what is commonly referred to as its tail, and a residue of the radically transferable group at what is commonly referred to as its head.

In an embodiment of the present invention, the pigment dispersant is prepared by atom transfer radical polymerization (ATRP). The ATRP process can be described generally as comprising: polymerizing one or more radically polymerizable monomers in the presence of an initiation system; forming a polymer; and isolating the formed polymer. In the present invention, the initiation system comprises: a polymeric initiator having at least one radically transferable atom or group; a transition metal compound, i.e., a catalyst, which participates in a reversible redox cycle with the initiator; and a ligand, which coordinates with the transition metal compound. The ATRP process is described in further detail in international patent publication WO 98/40415 and U.S. Pat. Nos. 5,807,937, 5,763,548 and 5,789,487.

Catalysts that may be used in the ATRP preparation of the pigment dispersant, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula I, $$TM^{n+}X_n \qquad \qquad I$$

wherein TM is the transition metal, n is the formal charge on the transition metal having a value of from 0 to 7, and X is a counterion or covalently bonded component. Examples of the transition metal (TM) include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$–$C_6$-alkoxy, cyano, cyanato, thiocyanato and azido. A preferred transition metal is Cu(I) and X is preferably halide, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, $Cu(II)Cl_2$ when Cu(I)Cl is used. Additional catalysts useful in preparing the pigment dispersant are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the pigment dispersant, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. A preferred class of ligands are the substituted bipyridines, e.g., 4,4'-dialkyl-bipyridyls. Additional ligands that may be used in preparing pigment dispersant are described in U.S. Pat. No. 5,807,937 at column 18, line 57 through column 21, line 43.

The polymeric initiator used in the preparation of the pigment dispersant by ATRP may be selected from polyethers, polyesters, polyurethanes, polymers prepared by non-living or controlled radical polymerization of at least one radically polymerizable ethylenically unsaturated second monomer and mixtures thereof. Each polymeric initiator has at least one radically transferable group. The radically transferable group of the polymeric initiator may be selected from, for example, cyano, cyanato, thiocyanato, azido, halide groups and combinations thereof. Preferably, the radically transferable group of the polymeric initiator is a halide.

In the ATRP preparation of the pigment dispersant, the amounts and relative proportions of polymeric initiator, transition metal compound and ligand are those for which ATRP is most effectively performed. The amount of polymeric initiator present in the reaction medium can vary widely. Typically, the weight ratio of the first monomer to the polymeric initiator is from 0.1:1 to 10 to 1, e.g., from 0.2:1 to 1:5 or from 0.5:1 to 2:1.

In preparing the pigment dispersant by ATRP methods, the molar ratio of transition metal compound to polymeric initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The pigment dispersant may be prepared in the absence of solvent, i.e., by means of a bulk polymerization process. Generally, the pigment dispersant is prepared in the presence of a solvent, typically water and/or an organic solvent. Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, halogenated hydrocarbon solvents, amides, nitrites, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are toluene, xylene, and mixed aromatic solvents such as those commercially available from Exxon Chemical America under the trademark SOLVESSO. Additional solvents are described in further detail in U.S. Pat. No. 5,807,937 at column 21, line 44 through column 22, line 54.

The ATRP preparation of the pigment dispersant is typically conducted at a reaction temperature within the range of 25° C. to 140° C., e.g., from 50° C. to 100° C., and a pressure within the range of 1 to 100 atmospheres, usually at ambient pressure. The atom transfer radical polymerization is typically completed in less than 24 hours, e.g., between 1 and 8 hours.

The ATRP transition metal catalyst and its associated ligand are typically separated or removed from the pigment dispersant prior to its use in the pigment dispersions of the present invention. Removal of the ATRP catalyst is achieved using known methods, including, for example, adding a catalyst binding agent to a mixture of the pigment dispersant, solvent and catalyst, followed by filtering. Examples of suitable catalyst binding agents include, for example, alumina, silica, clay or a combination thereof. A mixture of the pigment dispersant, solvent and ATRP catalyst may be passed through a bed of catalyst binding agent. Alternatively, the ATRP catalyst may be oxidized in situ, the oxidized residue of the catalyst being retained with the pigment dispersant.

The polymeric initiator forms the polymeric backbone segment of the pigment dispersant. When prepared by ATRP methods, the backbone segment of the pigment dispersant may contain a residue of a polyether, polyester, polyurethane, or a polymer prepared by the non-living or controlled radical polymerization of a second monomer. As used herein and in the claims, the term "polymeric initiator" is meant to refer to polymeric initiators, oligomeric initiators and mixtures of polymeric and oligomeric initiators.

Polyethers that may be used as the polymeric initiator are prepared by methods known to the skilled artisan. Typically, polyethers are prepared by the polymerization of one or more alkylene oxides, e.g., ethylene oxide, propylene oxide, 1,2-butylene oxide and 2,3-butylene oxide. The polyether may be in the form of a homopolymer, a block copolymer (e.g., a diblock or triblock copolymer) or a random copolymer.

The terminal hydroxy groups of the polyether may be used to introduce radically transferable groups into the polyether. For example, the terminal hydroxy groups of the polyether can be esterified or transesterified with an alpha-halocarboxylic acid, such as 2-bromopropionic acid, or an alpha-halocarboxylic acid ester, such as t-butyl 2-bromopropionate. In addition, the terminal hydroxy groups of the polyether may be reacted with an alpha-halocarboxylic acid halide, such as 2-bromopropionyl bromide or 2-methyl-2-bromopropionyl bromide. Examples of polyethers that may be used as polymeric initiators include, but are not limited to, 2-bromopropionate capped poly (ethylene oxide), 2-bromopropionate capped poly(propylene oxide) and 2-bromopropionate capped poly(ethylene oxide)-b-poly(propylene oxide). Polyethers useful as polymeric initiators in the preparation of the pigment dispersant in the present invention typically have a number average molecular weight of from 1000 to 50,000, e.g., from 3000 to 20,000, as determined by gel permeation chromatography using polystyrene standards.

Polyesters that may be used as polymeric initiators in the preparation of the pigment dispersant may be prepared by art-recognized methods. Typically, a di-carboxylic acid functional monomer or di-carboxylic acid ester functional monomer is polymerized with a diol in the presence of an acid catalyst with the concurrent removal of water or alcohol from the reaction vessel. By selecting the molar ratio of carboxylic acid (or ester) monomer to diol, the resulting polyester will be either carboxylic acid (or ester) or hydroxy terminated. To introduce branching into the polyester, a tri-or tetra-functional monomer, typically a triol or tertol, may be used in the polymerization in amounts less than that which would result in gelation of the reaction mixture.

Classes of carboxylic acid functional monomers (and their associated esters or anhydrides) that may be used to prepare the polyester initiator include, but are not limited to: linear or branched aliphatic dicarboxylic acids, e.g., oxalic acid and adipic acid; cycloaliphatic dicarboxylic acids, e.g., cyclohexane dicarboxylic acid; aromatic dicarboxylic acids, e.g., phthalic acid, isophthalic acid and terephthalic acid. Classes of hydroxy functional monomers that may be used to prepare the polyester initiator include, but are not limited to: linear or branched aliphatic diols, e.g., alkylene glycols, such as ethylene glycol and propylene glycol, and poly (alkylene glycols), such as poly(ethylene glycol); cycloaliphatic diols, e.g., cyclohexane diol; aromatic diols, e.g., catechol and resorcinol; and polyols having more than 2 hydroxy groups, e.g., trimethylol propane, trimethylol ethane, pentaerythritol, di-trimethylol propane and di-pentaerythritol.

When the polyester is hydroxy terminated, the terminal hydroxy groups may be used to introduce radically transferable groups into the polyester. The terminal hydroxy groups of the polyester may be esterified with an alpha-halocarboxylic acid, transesterified with an alkyl alpha-halocarboxylic acid ester, or reacted with an alpha-halocarboxylic acid halide, as described previously herein with regards to the polyether initiator. When the polyester is carboxylic acid or carboxylic acid ester terminated, esterification or transesterification with a hydroxyalkyl alpha-bromo carboxylic acid ester, such as 2-hydroxyethyl 2-bromopropionate, may be used to introduce radically transferable groups into the polyester. Polyesters useful as polymeric initiators in the preparation of the pigment dispersant in the present invention typically have a number average molecular weight of from 1000 to 50,000, e.g., from 3000 to 20,000, as determined by gel permeation chromatography using polystyrene standards.

Polyurethanes that may be used as the polymeric initiator may be prepared by methods known to those of ordinary skill in the art. Such known methods generally involve the reaction of a diisocyanate and a diol in molar ratios that result in the formation of either an isocyanate or hydroxy terminated polyurethane. To form branched polyurethanes polyfunctional isocyanates, e.g., tri-isocyanates, and polyols, e.g., triols, may be present during the polymerization in amounts that do not result in gelation of the reactants.

Classes of isocyanate functional monomers that may be used to prepare the polyurethane initiator include, but are not limited to, linear or branched aliphatic diisocyanates, e.g., 1,4-butylene diisocyanate and 1,6-hexamethylene diisocyanate; cycloaliphatic diisocyanates, e.g., isophorone diisocyanate; aromatic diisocyanates wherein the isocyanate groups are not bonded directly to the aromatic ring, e.g., $\alpha,\alpha'$-xylene diisocyanate; aromatic polyisocyanates wherein the isocyanate groups are bonded directly to the aromatic ring, e.g., benzene diisocyanate and toluenediisocyanate; halogenated, alkylated, alkoxylated, nitrated, carbodiimide modified, urea modified and biuret modified derivatives of diisocyanates belonging to these classes; and dimerized and trimerized products of polyisocyanates belonging to these classes, e.g., a trimer of isophorone diisocyanate. Classes of hydroxy functional monomers that may be used to prepare the polyurethane initiator include, but are not limited to, those as recited previously herein with regard to the preparation of the polyester initiator.

When the polyurethane is hydroxy terminated, the terminal hydroxy groups may be used to introduce radically transferable groups into the polyester. The terminal hydroxy groups of the polyurethane may be esterified with an alpha-halocarboxylic acid, transesterified with an alkyl alpha-halocarboxylic acid ester, or reacted with an alpha-halocarboxylic acid halide, as described previously herein with regard to the polyether initiator. When the polyurethane is isocyanate terminated, reaction with a hydroxyalkyl alpha-halocarboxylic acid ester, such as 2-hydroxyethyl 2-bromopropionate, may be used to introduce radically transferable groups into the polyurethane. Polyurethanes that may be used as polymeric initiators in the present invention typically have a number average molecular weight of from 1000 to 50,000, e.g., from 3000 to 20,000, as determined by gel permeation chromatography using polystyrene standards.

In an embodiment of the present invention, the polymeric initiator is a polymer prepared from the non-living radical polymerization or the controlled radical polymerization of at least one radically polymerizable ethylenically unsaturated second monomer. The second monomer may be selected from vinyl monomers, e.g., (meth)acrylate monomers, allylic monomers, olefins and mixtures thereof as will be described in further detail below. As used herein and in the claims, by "(meth)acrylate" and like terms is meant methacrylates, acrylates and mixtures of methacrylates and acrylates. The term "non-living radical polymerization" and similar terms, e.g., "free radical polymerization," as used herein and in the claims refer to those conventional methods of radical polymerization that provide a lesser degree of control over polymer chain architecture, molecular weight and polydispersity, relative to the control provided by controlled radical polymerization methods, such as ATRP. Non-living free radical polymerization techniques are known to those of ordinary skill in the art, and typically make use of suitable initiators, which include organic peroxides, e.g., di(t-butyl) peroxide, and azo type compounds, e.g., 1,1'-azobis(isobutylnitrile).

The non-living radical polymerization may optionally be performed in the presence of chain transfer agents, such as alpha-methyl styrene dimer and tertiary dodecyl mercaptan. The non-living radical polymerization of the second monomer may be performed in the absence of solvent. More typically, the non-living radical polymerization is performed in the presence of a solvent, most often an organic solvent, such as esters of carboxylic acids, ethers, cyclic ethers, $C_5$–$C_{10}$ alkanes, $C_5$–$C_8$ cycloalkanes, aromatic hydrocarbon solvents, halogenated hydrocarbon solvents, amides, nitrites, sulfoxides, sulfones and mixtures thereof.

Radically transferable groups may be introduced into the polymeric initiator during its preparation by non-living radical polymerization or by means of a post-reaction after completion of the non-living radical polymerization. When the polymeric initiator is prepared by non-living radical polymerization, the radically transferable groups will typically be located randomly along the backbone of the prepolymer.

The introduction of radically transferable groups during the course of the non-living radical polymerization of the second monomer typically involves the use of radically polymerizable monomers having groups or atoms that are radically transferable under ATRP conditions. Examples of monomers having radically transferable groups that may be used to prepare the polymeric initiator include, but are not limited to, halomethyl styrene, e.g., p-chloromethylstyrene and p-bromomethylstyrene; alpha-halocarboxylic acid esters of hydroxyalkyl (meth)acrylates, e.g., 2-(2-bromopropionoxy)ethyl (meth)acrylate and 2-(2-bromo-2-methylpropionoxy)ethyl (meth)acrylate; alpha-haloacrylates, e.g., methyl alpha-chloroacrylate; haloacrylonitriles, e.g., chloroacrylonitrile; vinyl esters of alpha-halocarboxylic acids, e.g., vinyl chloroacetate; allyl esters of alpha-halocarboxylic acids, e.g., allyl chloroacetate; and mixtures of such monomers.

Radically transferable groups may be introduced into the polymeric initiator when it is prepared by non-living radical polymerization by means of a post-polymerization reaction. For example, residues of hydroxyalkyl (meth)acrylates, such as 2-hydroxyalky methacrylate, in the polymeric initiator precursor backbone may be reacted with an alpha-halocarboxylic acid halide, such as 2-bromopropionyl bromide. The polymeric initiator prepared from the non-living radical polymerization of at least one second monomer typically has a number average molecular (Mn) weight of from 1000 to 100,000, e.g., from 3000 to 20,000, as determined by gel permeation chromatography using polystyrene standards.

The polymeric initiator may also be prepared by the controlled radical polymerization of at least one second monomer, and can have well defined polymer chain architecture, molecular weight and polydispersity index values of less than 2.0. In an embodiment of the present invention, the polymeric initiator is prepared by ATRP, in which case radically transferable groups are preferably introduced into the polymeric initiator by means of a post-polymerization reaction. For example, the ATRP prepared polymeric initiator precursor may contain residues of a hydroxyalkyl (meth)acrylate, such as 2-hydroxyethyl methacrylate, in block, alternating or gradient sequences with other monomer residues, such as methoxy poly (ethylene glycol) methacrylate. Radically transferable groups may then be introduced into the ATRP prepared polymeric initiator precursor by reaction of its pendent hydroxy groups with an alpha-halocarboxylic acid halide, such as 2-bromopropionyl bromide. The polymeric initiator prepared from the controlled radical polymerization of at least one second monomer typically has a number average molecular (Mn) weight of from 1000 to 30,000, e.g., from 3000 to 20,000, and a polydispersity index (Mn/Mw) of less than 2.0, e.g., less than 1.8 or less than 1.5, as determined by gel permeation chromatography using polystyrene standards.

In a preferred embodiment of the present invention, the polymeric initiator is prepared from the non-living or controlled radical polymerization of the second monomer, and each of the first monomer (which forms the teeth of the pigment dispersant) and the second monomer are independently selected from vinyl monomers, allylic monomers, olefins and mixtures thereof. Classes of vinyl monomers from which each of the first and second monomers may be independently selected include, but are not limited to, (meth) acrylic acid, (meth)acrylates, (meth)acrylamide, N- and N,N-disubstituted (meth)acrylamides, vinyl aromatic monomers, vinyl halides and vinyl esters of carboxylic acids.

Examples of $C_1$–$C_{20}$ alkyl (meth)acrylates (including linear or branched alkyls and cycloalkyls) from which each of the first and second monomers may be independently selected include, but are not limited to, methyl (meth) acrylate, ethyl (meth)acrylate, propyl (meth)acrylate, isopropyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth) acrylate, cyclohexyl (meth)acrylate, 3,3,5-trimethylcyclohexyl (meth)acrylate and isocane (meth) acrylate. Examples of oxirane functional (meth)acrylates from which each of the first and second monomers may be independently selected include, but are not limited to, glycidyl (meth)acrylate, 3,4-epoxycyclohexylmethyl(meth) acrylate, and 2-(3,4-epoxycyclohexyl)ethyl(meth)acrylate. Hydroxy alkyl (meth)acrylates having from 2 to 4 carbon atoms in the alkyl group from which each of the first and second monomers may be independently selected include, but are not limited to, hydroxyethyl (meth)acrylate, hydroxypropyl (meth)acrylate and hydroxybutyl (meth)acrylate. Examples of monomers having more than one (meth) acryloyl group, from which each of the first and second monomers may be independently selected, include, but are not limited to (meth)acrylic anhydride, diethyleneglycol bis(meth)acrylate, 4,4'-isopropylidenediphenol bis(meth) acrylate (Bisphenol A di(meth)acrylate), alkoxylated 4,4'-isopropylidenediphenol bis(meth)acrylate, trimethylolpropane tris(meth)acrylate and alkoxylated trimethylolpropane tris( meth)acrylate.

Specific examples of vinyl aromatic monomers from which each of the first and second monomers may be selected include, but are not limited to, styrene, p-chloromethylstyrene, divinyl benzene, vinyl naphthalene and divinyl naphthalene. Vinyl halides from which each of the first and second monomers may be independently selected include, but are not limited to, vinyl chloride and vinylidene fluoride. Vinyl esters of carboxylic acids from which each of the first and second monomers may be independently selected include, but are not limited to, vinyl acetate, vinyl butyrate, vinyl 3,4-dimethoxybenzoate and vinyl benzoate.

As used herein and in the claims, by "olefin" and like terms is meant unsaturated aliphatic hydrocarbons having one or more double bonds, such as obtained by cracking petroleum fractions. Specific examples of olefins from which each of the first and second monomers may be independently selected include, but are not limited to, propylene, 1-butene, 1,3-butadiene, isobutylene and diisobutylene.

As used herein and in the claims, by "allylic monomer(s)" is meant monomers containing substituted and/or unsubstituted allylic functionality, i.e., one or more radicals represented by the following general formula II, $$H_2C=C(R_1)-CH_2- \qquad \text{II}$$

wherein $R_1$ is hydrogen, halogen or a $C_1$ to $C_4$ alkyl group. Most commonly, $R_1$ is hydrogen or methyl and consequently general formula II represents the (meth)allyl radical (i.e., the methallyl or allyl radical). Examples of allylic monomers from which each of the first and second monomers may be independently selected include, but are not limited to: (meth)allyl ethers, such as methyl (meth)allyl ether and (meth)allyl glycidyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers from which each of the first and second monomers may be independently selected include, but are not limited to: cyclic anhydrides, e.g., maleic anhydride, 1-cyclopentene-1,2-dicarboxylic anhydride and itaconic anhydride; esters of acids that are unsaturated but do not have α,β-ethylenic unsaturation, e.g., methyl ester of undecylenic acid; diesters of ethylenically unsaturated dibasic acids, e.g., di($C_1$–$C_4$ alkyl)ethyl maleates; maleimide and N-substituted maleimides.

In an embodiment of the present invention, each pendent polymeric segment of the pigment dispersant contains residues of monomers selected independently from oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_1$–$C_{20}$ alkyl (meth)acrylates, e.g., including those as previously recited herein; aromatic (meth)acrylates, e.g., phenyl (meth)acrylate, p-nitrophenyl (meth)acrylate and benzyl (meth)acrylate; polycyclicaromatic (meth)acrylates, e.g., 2-naphthyl (meth)acrylate; vinyl esters of carboxylic acids, e.g., hexanoic acid vinyl ester and decanoic acid vinyl ester; N,N-di($C_1$–$C_8$ alkyl) (meth)acrylamides, e.g., N,N-dimethyl (meth)acrylamide, N,N-diethyl (meth)acrylamide and N,N-dioctyl (meth)acrylamide; maleimide; N-substituted maleimides; and mixtures thereof. Examples of N-substituted maleimides include, but are not limited to, N-($C_1$–$C_{20}$ linear or branched alkyl) maleimides, e.g., N-methyl maleimide, N-tertiary-butyl maleimide, N-octyl maleimide and N-icosane maleimide; N-($C_3$–$C_8$ cycloalkyl) maleimides, e.g., N-cyclohexyl maleimide; and N-(aryl) maleimides, e.g., N-phenyl maleimide, N-($C_1$–$C_9$ linear or branched alkyl substituted phenyl) maleimide, N-benzyl maleimide and N-($C_1$–$C_9$ linear or branched alkyl substituted benzyl) maleimide.

The oxirane functional monomer residue of the pendent polymeric segment that is reacted with a carboxylic acid, may be selected from, for example, glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof. Examples of carboxylic acids that may be reacted with the oxirane functional monomer or its residue include, but are not limited to, para-nitrobenzoic acid, hexanoic acid, 2-ethyl hexanoic acid, decanoic acid, undecanoic acid and mixtures thereof.

The hydrophilic backbone segment of the pigment dispersant may contain nonionic moieties, ionic moieties and combinations thereof. In an embodiment of the present invention, the hydrophilic polymeric backbone segment contains residues of monomers selected from, for example, poly(alkylene glycol) (meth)acrylates; $C_1$–$C_4$ alkoxy poly(alkylene glycol) (meth)acrylates; hydroxyalkyl (meth) acrylates having from 2 to 4 carbon atoms in the alkyl group; N-(hydroxy $C_1$–$C_4$ alkyl) (meth)acrylamides (e.g., N-hydroxymethyl (meth)acrylamide and N-(2-hydroxyethyl) (meth)acrylamide); N,N-di-(hydroxy $C_1$–$C_4$ alkyl) (meth)acrylamides (e.g., N,N-di(2-hydroxyethyl) (meth)acrylamide); carboxylic acid functional monomers; salts of carboxylic acid functional monomers; amine functional monomers; salts of amine functional monomers; and mixtures thereof.

Poly(alkylene glycol) (meth)acrylates and $C_1$–$C_4$ alkoxy poly(alkylene glycol) (meth)acrylates that may be used to prepare the hydrophilic polymeric initiator are prepared by known methods. For example, (meth)acrylic acid or hydroxyalkyl (meth)acrylate, e.g., 2-hydroxyethyl (meth) acrylate, may be reacted with one or more alkylene oxides, e.g., ethylene oxide, propylene oxide and butylene oxide. Alternatively, an alkyl (meth)acrylate may be transesterified with a $C_1$–$C_4$ alkoxy poly(alkylene glycol), e.g., methoxy poly(ethylene glycol). Examples of preferred poly(alkylene glycol) (meth)acrylates and $C_1$–$C_4$ alkoxy poly(alkylene glycol) (meth)acrylates include, poly(ethylene glycol) (meth)acrylate and methoxy poly(ethylene glycol) (meth) acrylate, the poly(ethylene glycol) moiety of each having a molecular weight of from 100 to 800. An example of a commercially available $C_1$–$C_4$ alkoxy poly(alkylene glycol) (meth)acrylate is methoxy poly(ethylene glycol) 550 methacrylate monomer from Sartomer Company, Inc.

Examples of carboxylic acid functional monomers that may be present as monomer residues in the hydrophilic polymeric backbone segment of the pigment dispersant include, but are not limited to, (meth)acrylic acid, maleic acid, fumeric acid and undecylenic acid. The hydrophilic backbone segment may contain precursors of carboxylic acid functional monomer residues that are converted to carboxylic acid residues after completion of the polymerization, e.g., maleic anhydride and di($C_1$–$C_4$ alkyl) maleates. For example, residues of maleic anhydride can be converted to ester/acid residues or amide/acid residues by art-recognized reactions with alcohols or primary amines, respectively. Salts of carboxylic acid functional monomers that may be present as monomer residues in the hydrophilic backbone include, for example, salts of (meth)acrylic acid and primary, secondary or tertiary amines, such as, butyl amine, dimethyl amine and triethyl amine.

Amine functional monomers that may be present as monomer residues in the hydrophilic polymeric backbone segment of the pigment dispersant include, for example, amino($C_2$–$C_4$ alkyl) (meth)acrylates, e.g., 2-aminoethyl (meth)acrylate, 3-aminopropyl (meth)acrylate and 4-aminobutyl (meth)acrylate; N-($C_1$–$C_4$ alkyl)amino($C_2$–$C_4$ alkyl) (meth)acrylates, e.g., N-methyl-2-aminoethyl (meth) acrylate; and N,N-di($C_1$–$C_4$ alkyl)amino($C_2$–$C_4$ alkyl) (meth)acrylates, e.g., N,N-dimethyl-2-aminoethyl (meth) acrylate. The hydrophilic backbone of the pigment dispersant may also contain residues of salts of amine functional monomers, e.g., salts of those amine functional monomers as recited previously herein. Salts of the amine functional monomer residues may be formed by mixing a carboxylic acid, e.g., lactic acid, with the pigment dispersant after completion of polymerization.

In an embodiment of the present invention, the hydrophilic polymeric backbone segment of the pigment dispersant contains residues of carboxylic acid functional monomers selected from (meth)acrylic acid, maleic anhydride, maleic acid, di($C_1$–$C_4$ alkyl) maleates, and mixtures thereof. In a still further embodiment of the present invention, the hydrophilic polymeric backbone segment of the pigment dispersant contains residues of amine functional monomers selected from amino ($C_2$–$C_4$ alkyl) (meth)acrylates, N—($C_1$–$C_4$ alkyl)amino($C_2$–$C_4$ alkyl) (meth)acrylates, N,N-di($C_1$–$C_4$ alkyl)amino($C_2$–$C_4$ alkyl) (meth)acrylates and mixtures thereof.

The hydrophilic polymeric backbone segment of the pigment dispersant may also contain cationic moieties selected from ammonium, sulphonium and phosphonium. Ammonium, sulphonium and phosphonium moieties may be introduced into the polymeric backbone segment of the pigment dispersant by means known to the skilled artisan. For example, when the backbone segment contains residues of N,N-dimethyl-2-aminoethyl (meth)acrylate, the N,N-dimethylamino moieties may be converted to ammonium moieties by mixing an acid, e.g., lactic acid, with the pigment dispersant.

When the polymeric backbone segment contains residues of oxirane functional monomers, such as glycidyl (meth) acrylate, the oxirane groups may be used to introduce sulphonium or phosphonium moieties into the backbone segment. Sulphonium moieties may be introduced into the backbone segment by reaction of the oxirane groups with thiodiethanol in the presence of an acid, such as lactic acid. Reaction of the oxirane groups with a phosphine, e.g., triphenyl phosphine or tributyl phosphine, in the presence of an acid, such as lactic acid, results in the introduction of phosphonium moieties into the backbone segment.

When the pigment dispersant is prepared by ATRP, it may be represented in an embodiment of the present invention by the following representative general formula III,

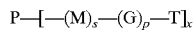   III in which P is the hydrophilic polymeric backbone segment, and —$(M)_s$—$(G)_p$—T is a pendent polymeric segment, at least a portion of which is hydrophobic. In general formula III, G and M are different from one another, G is a residue of at least one radically polymerizable ethylenically unsaturated monomer, and residue G has moieties selected from aromatic groups, polycyclic aromatic groups, aliphatic groups containing from 6 to 20 carbon atoms and combinations thereof. Also in general formula III, M is a residue of at least one radically polymerizable ethylenically unsaturated monomer; and T is or is derived from the radically transferable group of the polymeric initiator, which is preferably a halide. The subscript x in general formula III is a number from 1 to a number equal to the number of radically transferable groups of the polymeric initiator; the subscripts p and s represent average numbers of residues occurring in a block of residues; and p and s are each individually selected such that each pendent polymeric segment has a formula weight of at least 250.

With reference to general formula III, G may be a residue of at least one monomer selected from (i) oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof, (ii) alkyl (meth)acrylates having from 6 to 20 carbon atoms in the alkyl group and (iii) mixtures of (i) and (ii). The oxirane functional monomer, carboxylic acids and $C_6$–$C_{20}$ alkyl (meth)acrylates may each be selected from those respective examples as recited previously herein.

With further reference to general formula III, M may be a residue of at least one alkyl (meth)acrylate having from 1 to 4 carbon atoms in the alkyl groups. Examples of $C_1$–$C_4$ alkyl (meth)acrylates of which M may be a residue include, methyl (meth)acrylate, ethyl (meth)acrylate, propyl (meth)acrylate, iso-propyl (meth)acrylate, n-butyl (meth)acrylate, iso-butyl (meth)acrylate, tert-butyl (meth)acrylate and mixtures thereof.

In an embodiment of the present invention, M is a hydrophilic residue containing nonionic moieties, ionic moieties and combinations thereof. In general formula III, M may be a hydrophilic residue of any of those monomers having nonionic moieties as described previously herein with regard to the hydrophilic backbone segment of the pigment dispersant, e.g., poly(alkylene glycol) (meth)acrylates, $C_1$–$C_4$ alkoxy poly(alkylene glycol) (meth)acrylates and hydroxyalkyl (meth)acrylates having from 2 to 4 carbon atoms in the alkyl group. Further, M may be a hydrophilic residue of any of those monomers having ionic moieties as described previously herein with regard to the hydrophilic back bone segment of the pigment dispersant. When M is a hydrophilic residue, the ionic moieties it may contain include those as described previously herein, i.e., anionic moieties, such as salts of carboxylic acids, or cationic moieties, such as ammonium, sulphonium and phosphonium.

Each of M and G in general formula III may represent one or more types of monomer residues, while s and p represent the average total number of M and G residues occurring per block of M residues (M-Block) and G residues (G-block) respectively. When containing more than one type or species of monomer residue, the M- and G-blocks may each have at least one of random, block (e.g., di-block and tri-block), alternating and gradient architectures. For purposes of illustration, an M-block containing 6 residues of methyl methacrylate (MMA) and 6 residues of ethyl methacrylate (EMA), for which s is 12, may have di-block, tetra-block, alternating and gradient architectures as represented in general formulas IV, V, VI and VII.

Di-Block Architecture

-(MMA-MMA-MMA-MMA-MMA-MMA-EMA-EMA-EMA-EMA-EMA-EMA)-     IV

Tetra-Block Architecture

-(MMA-MMA-MMA-EMA-EMA-EMA-MMA-MMA-MMA-EMA-EMA-EMA)-     V

Alternating Architecture

-(MMA-EMA-MMA-EMA-MMA-EMA-MMA-EMA-MMA-EMA-MMA-EMA)-     VI

Gradient Architecture

-(MMA-MMA-MMA-EMA-MMA-MMA-EMA-EMA-MMA-EMA-EMA-EMA)-     VII

The G-block may be described in a manner similar to that of the M-block.

The order in which monomer residues occur along the pendent polymeric segments of the pigment dispersant is typically determined by the order in which the corresponding monomers are fed into the vessel in which the controlled radical polymerization is conducted. For example, the monomers that are incorporated as residues in the M-blocks of the pendent polymeric segments are generally fed into the reaction vessel prior to those monomers that are incorporated as residues in the G-blocks.

During formation of the M- and G-blocks, if more than one monomer is fed into the reaction vessel at a time, the relative reactivities of the monomers typically determines the order in which they are incorporated into the living pendent polymeric segments of the pigment dispersant. Gradient sequences of monomer residues within the M- and G-blocks can be prepared by controlled radical polymerization, and in particular by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937 at column 29, line 29 through column 31, line 35.

Subscripts s and p represent average numbers of residues occurring in the respective M and G blocks. Subscript s may be 0, or may have a value of at least 1, and preferably at least 5. Subscript s also typically has a value of less than 300, preferably less than 100, and more preferably less than 50 (e.g., 20). The value of subscript s may range between any combination of these values, inclusive of the recited values. Typically, subscript p has a value of at least 1, and preferably at least 5 for general formula III. Also, subscript p has a value of typically less than 300, preferably less than 100, and more preferably less than 50 (e.g., 20) for general formula III. The value of subscript p may range between any combination of these values, inclusive of the recited values.

In general formula III, P is a residue of the polymeric initiator, which forms the hydrophilic polymeric backbone segment of the pigment dispersant. As discussed previously herein, the polymeric initiator has at least one radically transferable group, and subscript x is a number from 1 to a number equal to the number of radically transferable groups of the polymeric initiator. Subscript x may be a number from 1 to 50, e.g., a number from 1 to 20, from 1 to 10 or from 1 to 5. When x is a number less than the total number of radically transferable groups initially present on the polymeric initiator, the residue of the polymeric initiator (i.e., the polymeric backbone segment of the pigment dispersant) will still contain a balance of radically transferable groups bonded thereto, which are not shown in general formula III.

In general formula III, T is or is derived from the radically transferable group of the ATRP polymeric initiator. The residue of the radically transferable group may be (a) left on the pigment dispersant, (b) removed or (c) chemically converted to another moiety. The radically transferable group may be removed by substitution with a nucleophilic compound, e.g., an alkali metal alkoxylate. When the residue of the radically transferable group is a cyano group (—CN), it can be converted to an amide group or carboxylic acid group by methods known in the art.

In a preferred embodiment of the present invention, the radically transferable group is a halide, which can be removed from the pigment dispersant by means of a mild dehalogenation reaction. The reaction is typically performed as a post-reaction after the pigment dispersant has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen containing pigment dispersant with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound).

Not intending to be bound by any theory, it is believed, based on the evidence at hand, that the reaction between the halogen containing pigment dispersant and one or more LRPEU compounds results in (1) removal of the halogen group, and (2) the addition of at least one carbon-carbon double bond where the carbon-halogen bond is broken. The dehalogenation reaction is typically conducted at a temperature in the range of 0° C. to 200° C., e.g., from 0° C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at least a stoichiometric amount relative to the moles of halogen present in the pigment dispersant. When added in excess of a stoichiometric amount, the LRPEU compound is typically present in an amount of no greater than 5 mole percent, e.g., 1 to 3 mole percent, in excess of the total moles of halogen.

Limited radically polymerizable ethylenically unsaturated compounds useful for dehalogenating the pigment dispersant under mild conditions include those represented by the following general formula VIII.

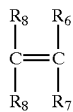

VIII

In general formula VIII, $R_6$ and $R_7$ can be the same or different organic groups such as: alkyl groups having from 1 to 4 carbon atoms; aryl groups; alkoxy groups; ester groups; alkyl sulfur groups; acyloxy groups; and nitrogen-containing alkyl groups where at least one of the $R_6$ and $R_7$ groups is an organo group while the other can be an organo group or hydrogen. For instance when one of $R_6$ or $R_7$ is an alkyl group, the other can be an alkyl, aryl, acyloxy, alkoxy, arenes, sulfur-containing alkyl group, or nitrogen-containing alkyl and/or nitrogen-containing aryl groups. The $R_8$ groups can be the same or different groups selected from hydrogen or lower alkyl selected such that the reaction between the terminal halogen of the pigment dispersant and the LRPEU compound is not prevented. Also an RB group can be joined to the $R_6$ and/or the $R_7$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between the halogen containing pigment dispersant and an LRPEU compound, e.g., alpha-methyl styrene, is summarized in the following general scheme 1.

General Scheme 1

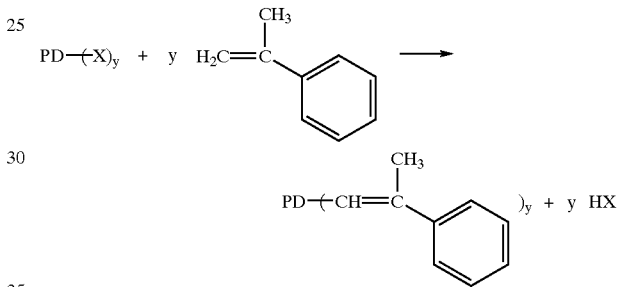

In general scheme 1, PD-$(X)_y$ represents the halogen containing pigment dispersant, and y is the number of halogens pendent from the pigment dispersant.

Upon completion of the controlled radical polymerization of the polymeric initiator and the first monomer, the pigment dispersant has a comb-like architecture, which can be described in further detail with reference to drawing FIGS. 1 and 2. In FIG. 1, the pigment dispersant 7 has a hydrophilic polymeric backbone segment 25 (which is a residue of the polymeric initiator), and pendent polymeric segments 28, 31 and 34 (at least a portion of each being hydrophobic). Each of pendent polymeric segments 28, 31 and 34 have a terminal group T, which is or is derived from the radically transferable group of the polymeric initiator.

When the polymeric initiator is prepared by the non-living radical polymerization of one or more second monomers, pigment dispersant 7 will typically be composed of a mixture of comb-like polymers having polymeric backbone segments 25 of varying molecular weights and varying numbers of pendent polymeric segments. In addition, the second monomer residues and the pendent polymeric residues will be distributed randomly along the hydrophilic polymeric backbone segment of pigment dispersant 7.

Figure 2:
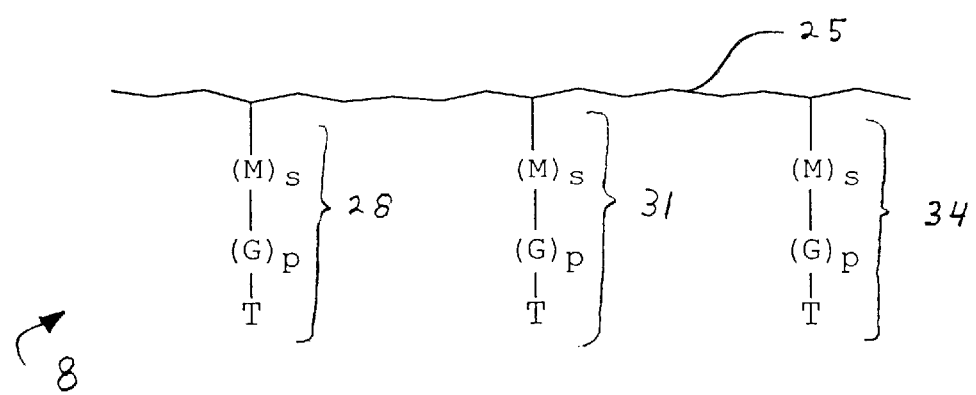
FIG. 2 is a diagrammatic representation of a pigment dispersant similar to that depicted in FIG. 1 in which the polymer chain architecture of the polymeric segments pendent to the polymeric backbone segment are shown in further detail.

In FIG. 2, the pendent polymeric segments 28, 31 and 34 of pigment dispersant 8 are shown in further detail. Pigment dispersant 8 of FIG. 2 is a diagrammatic representation of the pigment dispersant represented in general formula III, in which the polymeric backbone segment 25 is equivalent to P-, and subscript x is 3. The letters M, G, T, s and p in FIG. 2 have the same meanings as described previously herein with reference to general formula III. Each of M, G, T, s and p of pendent polymeric segments 28, 31 and 34 of pigment dispersant 8 may be the same or different.

Pigment dispersants useful in the pigment dispersions of the present invention can be described in further detail with reference to FIG. 2. In an embodiment of the present invention, the polymeric backbone segment 25 of pigment dispersant 8 contains residues of methyl methacrylate and methoxy poly(ethylene glycol) methacrylate, M is a residue of iso-butyl methacrylate, G is a residue of an adduct of glycidyl methacrylate and para-nitrobenzoic acid, and s and p are each independently from 1 to 20. In another embodiment of the present invention, the polymeric backbone segment 25 of pigment dispersant 8 contains residues of methyl methacrylate and methoxy poly(ethylene glycol) methacrylate, G is a residue of an adduct of glycidyl methacrylate and para-nitrobenzoic acid, s is 0, and p is from 1 to 20.

The pigment dispersant (c) is typically present in the pigment dispersion of the present invention in an amount of at least 0.1 percent by weight, preferably at least 0.5 percent by weight, and more preferably at least 1 percent by weight, based on the total weight of the pigment dispersion. The pigment dispersant is also typically present in the pigment dispersion in an amount of less than 65 percent by weight, preferably less than 40 percent by weight, and more preferably less than 25 percent by weight, based on the total weight of the pigment dispersion. The amount of pigment dispersant (c) present in the pigment dispersion of the present invention may range between any combination of these values, inclusive of the recited values.

The pigment of the pigment dispersion of the present invention may be selected from inorganic pigments, such as carbon black pigments, e.g., furnace blacks, electrically conductive carbon black pigments, extender pigments and corrosion inhibitive pigments; organic pigments; and mixtures thereof. Examples of organic pigments that may be present in the pigment dispersion include, but are not limited to, perylenes, phthalo green, phthalo blue, nitroso pigments, manoazo pigments, diazo pigments, diazo condensation pigments, basic dye pigments, alkali blue pigments, blue lake pigments, phloxin pigments, quinacridone pigments, lake pigments of acid yellow 1 and 3, carbazole dioxazine violet pigments, alizarine lake pigments, vat pigments, phthaloxy amine pigments, carmine lake pigments, tetrachloroisoindolinone pigments and mixtures thereof. Inorganic pigments that may be present in the pigment dispersion, include, for example, titanium dioxide, electrically conductive titanium dioxide, and iron oxides, e.g., red iron oxide, yellow iron oxide, black iron oxide and transparent iron oxides. Extender pigments that may be present in the pigment dispersion include, but are not limited to, silicas, clays, and alkaline earth metal sulfates, such as calcium sulfate and barium sulfate. The pigment dispersion may contain corrosion inhibitive pigments, such as aluminum phosphate and calcium modified silica.

The pigment (a) is typically present in the pigment dispersion of the present invention in an amount of at least 0.5 percent by weight, preferably at least 5 percent by weight, and more preferably at least 20 percent by weight, based on the total weight of the pigment dispersion. The pigment is also typically present in the pigment dispersion in an amount of less than 90 percent by weight, preferably less than 80 percent by weight, and more preferably less than 75 percent by weight, based on the total weight of the pigment dispersion. The amount of pigment present in the pigment dispersion may range between any combination of these values, inclusive of the recited values.

The pigment (a) and pigment dispersant (c) are typically together present in the pigment dispersion in an amount totaling from 20 percent by weight to 80 percent by weight, e.g., from 30 percent by weight to 70 percent by weight or from 40 percent by weight to 60 percent by weight. The percent weights are based on the total combined weight of the pigment and pigment dispersant. The weight ratio of pigment (a) to pigment dispersant (c) is typically from 0.1:1 to 100:1, e.g., from 0.2:1 to 5:1 or from 0.5:1 to 2:1.

The pigment dispersion of the present invention also comprises an aqueous carrier selected from water and a mixture of water and at least one organic solvent (preferably a water soluble organic solvent). Classes of organic solvents that may be present in the aqueous carrier include, but are not limited to, alcohols, e.g., methanol, ethanol, n-propanol, iso-propanol, n-butanol, sec-butyl alcohol, tert-butyl alcohol, iso-butyl alcohol, furfuryl alcohol and tetrahydrofurfuryl alcohol; ketones or ketoalcohols, e.g., acetone, methyl ethyl ketone, and diacetone alcohol; ethers, e.g., dimethyl ether and methyl ethyl ether; cyclic ethers, e.g., tetrahydrofuran and dioxane; esters, e.g., ethyl acetate, ethyl lactate, ethylene carbonate and propylene carbonate; polyhydric alcohols, e.g., ethylene glycol, diethylene glycol, triethylene glycol, propylene glycol, tetraethylene glycol, polyethylene glycol, glycerol, 2-methyl-2,4-pentanediol and 1,2,6-hexantriol; hydroxy functional ethers of alkylene glycols, e.g., butyl 2-hydroxyethyl ether, hexyl 2-hydroxyethyl ether, methyl 2-hydroxypropyl ether and phenyl 2-hydroxypropyl ether; nitrogen containing cyclic compounds, e.g., pyrrolidone, N-methyl-2-pyrrolidone and 1,3-dimethyl-2-imidazolidinone; and sulfur containing compounds such as thioglycol, dimethyl sulfoxide and tetramethylene sulfone.

When the aqueous carrier comprises a mixture of water and organic solvent, the aqueous carrier typically contains from 30 to 95 percent by weight of water, and from 5 to 70 percent by weight of organic solvent, e.g., from 60 to 95 percent by weight of water, and from 5 to 40 percent by weight of organic solvent. The percent weights are based on the total weight of the aqueous carrier.

The aqueous carrier (b) is typically present in the pigment dispersion of the present invention, in an amount of at least 5 percent by weight, preferably at least 15 percent by weight, and more preferably at least 30 percent by weight, based on the total weight of the pigment dispersion. The aqueous carrier is also typically present in the pigment dispersion in an amount of less than 99.4 percent by weight, preferably less than 80 percent by weight, and more preferably less than 60 percent by weight, based on the total weight of the pigment dispersion. The amount of aqueous carrier present in the pigment dispersion may range between any combination of these values, inclusive of the recited values.

The pigment dispersion may be prepared by methods that are known to those of ordinary skill in the art. Such known methods typically involve the use of energy intensive mixing or grinding means, such as ball mills or media mills (e.g., sand mills), as described previously herein.

The pigment dispersion of the present invention is useful in the preparation of, for example, coatings compositions and inks. To form a pigmented coating composition, the pigment dispersion is typically mixed together with resins, crosslinkers, additives, such as flow control agents, and additional solvents. Coating compositions into which the pigment dispersion of the present invention may be incorporated include, for example, liquid spray-, dip- and curtain-applied primer, basecoat (i.e., the basecoat in a color-plus-clear basecoat/clearcoat system) and topcoat compositions, and electrodepositable coating compositions.

The present invention is more particularly described in the following examples, which are intended to be illustrative only, since numerous modifications and variations therein will be apparent to those skilled in the art. Unless otherwise specified, all parts and percentages are by weight.

SYNTHESIS EXAMPLES A–D

Synthesis Examples A through D describe the preparation of a pigment dispersant that is used to prepare a pigment dispersion according to the present invention as described in the pigment dispersion Example.

Example A

A polymeric initiator precursor was prepared by non-living radical polymerization from the ingredients enumerated in Table A. The polymeric initiator precursor was modified to form a polymeric initiator as described in Example B.

TABLE A

| Ingredients | Parts by weight |
| --- | --- |
| Charge 1 | |
| methyl isobutyl ketone | 300 |
| Charge 2 | |
| hydroxypropyl methacrylate monomer | 87 |
| methyl methacrylate monomer | 30 |
| MPEG 550 MA monomer (a) | 625 |
| t-amylperoxy(2-ethylhexanoate) (b) | 32 |
| methyl isobutyl ketone | 100 |
| Charge 3 | |
| t-amylperoxy(2-ethylhexanoate) (b) | 3 |
| methyl isobutyl ketone | 20 |

(a) MPEG 550 MA monomer is a methoxy poly(ethylene glycol) methacrylate monomer from Sartomer Company, Inc.
(b) LUPEROX® 575 is a free radical initiator obtained commercially from Elf Atochem.

Charge 1 was added to a 2 liter 4-necked flask equipped with a motor driven stainless steel stir blade, water cooled condenser, and a heating mantle and thermometer connected through a temperature feed-back control device. The contents of the flask were heated to 110° C. under a continuous dry nitrogen sweep. Charge 2 was added over a period of 2.5 hours, followed by an additional 1 hour hold at 110° C. Charge 3 was dumped into the flask, followed by a 2.5 hour hold at 110° C. The contents of the flask were cooled, methyl isobutyl ketone was removed by vacuum distillation, and the resin was dissolved in tetrahydrofuran to a resin solids of 64.3 percent by weight, based on total weight.

Example B

A polymeric initiator was prepared from the precursor of Example A as summarized in Table B.

TABLE B

| Ingredients | Parts by weight |
| --- | --- |
| Charge 1 | |
| polymeric initiator precursor of Example A | 1206 |
| imidazole | 45 |
| Charge 2 | |
| 2-bromoisobutyryl bromide | 150 |
| Charge 3 | |
| methylene chloride | 400 |

Charge 1 was added to a 2 liter flask equipped similarly as described in Example A. The contents of the flask were heated to 60° C., and Charge 2 was added over a period of 2 hours, followed by a 4 hour hold at 60° C. Upon cooling the contents of the- flask to ambient room temperature, Charge 3 was added, the contents were then vacuum filtered through filter paper, and washed with 400 grams of deionized water. The filtered and washed resin was placed in a separatory funnel, from which the organic layer was collected, dried over calcium sulfate and stripped of solvent by means of vacuum distillation. The stripped resin was dissolved in toluene to a resin solids of 59.5 percent by weight, based on total weight.

Example C

A pigment dispersant precursor was prepared by controlled radical polymerization from the ingredients as enumerated in the following Table C. The pigment dispersant precursor was modified to form a pigment dispersant as described in Example D.

TABLE C

| Ingredients | Parts by weight |
| --- | --- |
| Charge 1 | |
| glycidyl methacrylate monomer | 80 |
| copper powder (c) | 2.8 |
| 2,2'-dipyridyl | 3.5 |
| toluene | 30 |
| Charge 2 | |
| polymeric initiator of Example B (d) | 400 |
| Charge 3 | |
| magnesium silicate (e) | 60 |

(c) The copper powder had an average particle size of 25 microns, a density of 1 gram/cm³, and was obtained commercially from OMG Americas.
(d) Having a resin solids content of 59.5 percent by weight, based on total weight.
(e) MAGNESOL synthetic magnesium silicate obtained commerically from The Dallas Group of America.

Charge 1 was added under to a 2 liter 4-necked flask equipped with a motor driven stainless steel stir blade, water cooled condenser, and a heating mantle and thermometer connected through a temperature feed-back control device. The contents of the flask were heated to 60° C. under a continuous nitrogen sweep. Charge 2 was added to the flask, followed by a 2.25 hour hold at 60° C. Charge 3 was then added, and the contents of the flask were passed through a cake of MAGNESOL synthetic magnesium silicate. The filtered resin was then vacuum stripped, and the solids of the resin was adjusted to 28.5 percent by weight, based on total weight, by the addition of methyl 2-hydroxypropyl ether.

The pigment dispersant precursor of Example C was found to have: Mn=6030; Mw=20,640; z average molecular weight (Mz)=66,600; and a polydispersity index (PDI) (i.e., Mw/Mn)=3.42.

Example D

A pigment dispersant useful in the pigment dispersions of the present invention was prepared from the pigment dispersant precursor of Example C using the ingredients as enumerated in Table D.

TABLE D

| Ingredients | Parts by weight |
| --- | --- |
| Polymer of Example C (f) | 578 |
| para-nitrobenzoic acid | 44 |
| ethyltriphenylphosphonium iodide catalyst | 0.6 |

(f) Having a resin solids content of 28.5 percent by weight, based on total weight.

The ingredients listed in Table D were added to a 2 liter round bottom flask equipped with a motor driven stainless steel stir blade, water cooled reflux condenser, and a heating mantle and thermometer connected through a temperature feed-back control device. The contents of the flask were heated to and held at 110° C. for 11 hours under a continuous dry nitrogen sweep. The solvent was stripped under vacuum to 61.6 percent solids and the contents of the flask were then mixed with deionized water to form an aqueous composition having a resin solids content of 30.3 percent by weight, based on total weight. The pH of the polymer solution was adjusted to 8.9 with dimethylethanolamine.

Pigment Dispersion Example

A pigment dispersion according to the present invention, was prepared using the ingredients enumerated in Table 1.

TABLE 1

| Ingredients | Parts by weight |
| --- | --- |
| pigment dispersant of Example D | 210 |
| defoamer (g) | 2 |
| chlorinated copper phthalocyanine blue pigment (h) | 32 |
| aqueous dimethylethanolamine (i) | 0.6 |
| deionized water | 3 |

(g) BYK 031 defoamer from Byk-Chemie.
(h) B-4816 Palomar Blue chlorinated copper phthalocyanine blue pigment obtained from Bayer.
(i) 50 percent by weight dimethylethanolamine in deionized water.

The pigment dispersant of Example D, defoamer and deionized water were mixed in a stainless steal beaker using a cowles blade for approximately 10 minutes. The chlorinated copper phthalocyanine blue pigment was added to the stainless steal beaker with agitation from the cowles blade. The pH of the contents of the stainless steal beaker was adjusted to a value of 9 by addition of the aqueous dimethylethanolamine, followed by 15 minutes of additional mixing with the cowles blade to form a pre-paste. The pre-paste was then transferred to and ground in an Eiger Mini Motormill 100 (from Eiger Machine, Inc. of Chicago, Ill.). During the grinding process, the temperature of the contents of mill did not rise above 30° C. The pigment dispersion was removed from the mill and had a pigment to pigment dispersant weight ratio of 0.5, and a solids weight of 39 percent by weight based on the total weight of the pigment dispersion.

The pigment dispersion was found to have a mean particle size of 0.846 microns (as determined using a Coulter LS 230 Particle Size Analyzer from Beckman Coulter Corporation), and a haze value of 13.80 percent (as determined using a TCS Plus Spectrophotometer Model 8870 from Byk-Gardner). Mean particle sizes of less than 2 microns and haze values of less than 25 percent are considered generally to be desirable for aqueous pigment dispersions of chlorinated copper phthalocyanine blue pigment having a pigment to pigment dispersant weight ratio of 0.5 and a solids content of approximately 40 percent by weight, based on total weight.

The present invention has been described with reference to specific details of particular embodiments thereof. It is not intended that such details be regarded as limitations upon the scope of the invention except insofar as and to the extent that they are included in the accompanying claims.

We claim:

1. A pigment dispersion comprising:
    (a) pigment;
    (b) an aqueous carrier selected from water and a mixture of water and at least one organic solvent; and
    (c) a pigment dispersant prepared by controlled radical polymerization of at least one radically polymerizable ethylenically unsaturated first monomer in the presence of a polymeric initiator having at least one radically transferable group,
wherein said polymeric initiator forms a polymeric backbone segment, the first monomer forms polymeric segments pendent to said polymeric backbone segment, at least a portion of each pendent polymeric segment is hydrophobic, and said polymeric backbone segment is hydrophilic.

2. The pigment dispersion of claim 1 wherein said pigment dispersant is prepared by atom transfer radical polymerization; and said polymeric initiator is selected from the group consisting of polyethers, polyesters, polyurethanes, polymers prepared by non-living radical polymerization or controlled radical polymerization of at least one radically polymerizable ethylenically unsaturated second monomer and mixtures thereof.

3. The pigment dispersion of claim 2 wherein said radically transferable group of said polymeric initiator is a halide.

4. The pigment dispersion of claim 3 wherein said polymeric initiator is prepared from the non-living radical polymerization or controlled radical polymerization of said second monomer, and each of said first and second monomers are independently selected from vinyl monomers, allylic monomers, olefins and mixtures thereof.

5. The pigment dispersion of claim 4 wherein each pendent polymeric segment contains residues of monomers selected independently from the group consisting of: oxirane functional monomer reacted with a carboxylic acid selected from the group consisting of aromatic carboxylic acids, polycyclicaromatic carboxylic acids, aliphatic carboxylic acids having from 6 to 20 carbon atoms and mixtures thereof; $C_1$–$C_{20}$ alkyl (meth)acrylates; aromatic (meth)acrylates; polycyclicaromatic (meth)acrylates; vinyl esters of carboxylic acids; N,N-di($C_1$–$C_8$ alkyl) (meth)acrylamides; maleimide; N—($C_1$–$C_{20}$ alkyl) maleimides; N—($C_3$–$C_8$ cycloalkyl) maleimides; N—(aryl) maleimides; and mixtures thereof.

6. The pigment dispersion of claim 5 wherein said oxirane functional monomer is selected from the group consisting of glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof; and said carboxylic acid is selected from the group consisting of para-nitrobenzoic acid, hexanoic acid, 2-ethyl hexanoic acid, decanoic acid, undecanoic acid and mixtures thereof.

7. The pigment dispersion of claim 4 wherein said hydrophilic polymeric backbone segment contains nonionic moieties, ionic moieties and combinations thereof.

8. The pigment dispersion of claim 7 wherein said hydrophilic polymeric backbone segment contains residues of monomers selected from the group consisting of poly(alkylene glycol) (meth)acrylates, $C_1$–$C_4$ alkoxy poly(alkylene glycol) (meth)acrylates, hydroxyalkyl (meth)acrylates having from 2 to 4 carbon atoms in the alkyl group, N—(hydroxy $C_1$–$C_4$ alkyl) (meth)acrylamides, N,N-di-(hydroxy $C_1$–$C_4$ alkyl) (meth)acrylamides, carboxylic acid functional monomers, salts of carboxylic acid functional monomers, amine functional monomers, salts of amine functional monomers and mixtures thereof.

9. The pigment dispersion of claim 8 wherein the carboxylic acid functional monomers are selected from the group consisting of (meth)acrylic acid, maleic anhydride, maleic acid, di($C_1$–$C_4$ alkyl) maleates, and mixtures thereof; and the amine functional monomers are selected from the group consisting of amino($C_2$–$C_4$ alkyl) (meth)acrylates, N—($C_1$–$C_4$ alkyl)amino($C_2$–$C_4$ alkyl) (meth)acrylates, N,N-di($C_1$–$C_4$ alkyl)amino($C_2$–$C_4$ alkyl) (meth)acrylates and mixtures thereof.

10. The pigment dispersion of claim 7 wherein said hydrophilic polymeric backbone segment contains cationic moieties selected from ammonium, sulphonium and phosphonium.

11. The pigment dispersion of claim 1 wherein said hydrophilic polymeric backbone segment of said pigment dispersant has a calculated average value of 100×(oxygen weight+nitrogen weight)/carbon weight of from 55 to 133; and the hydrophobic portion of each pendent polymeric segment of said pigment dispersant has a calculated average value of 100×(oxygen weight+nitrogen weight)/carbon weight of from 10 to less than 55.

12. The pigment dispersion of claim 1 wherein the weight ratio of said first monomer to said polymeric initiator is from 0.1:1 to 10:1.

13. The pigment dispersion of claim 1 wherein pigment (a) is selected from inorganic pigments, organic pigments and combinations thereof.

14. The pigment dispersion of claim 1 wherein pigment (a) and said pigment dispersant (c) are together present in an amount of from 20 percent by weight to 80 percent by weight, based the total weight of said pigment dispersion.

15. The pigment dispersion of claim 14 wherein the weight ratio of pigment (a) to said pigment dispersant (c) is from 0.1:1 to 100:1.

16. The pigment dispersion of claim 1 wherein pigment (a) is present in an amount of from 0.5 percent to 90 percent by weight, based on total weight of said pigment dispersion, said aqueous carrier (b) is present in an amount of from 5 percent to 99.4 percent by weight, based on total weight of said pigment dispersion, and said pigment dispersant (c) is present in an amount of from 0.1 percent to 65 percent by weight, based on total weight of said pigment dispersion.

17. The pigment dispersion of claim 3 wherein said pigment dispersant (c) has the following representative polymer chain structure,

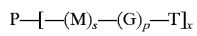

wherein P is said hydrophilic polymeric backbone segment; —(M)$_s$—(G)$_p$—T is said pendent polymeric segment; G is a residue of at least one radically polymerizable ethylenically unsaturated monomer, said residue G having moieties selected from aromatic groups, polycyclicaromatic groups, aliphatic groups containing from 6 to 20 carbon atoms and combinations thereof; M is a residue of at least one radically polymerizable ethylenically unsaturated monomer; G and M being different from one another; T is or is derived from said radically transferable halide of said polymeric initiator; x is a number from 1 to a number equal to the number of radically transferable halides of said polymeric initiator; p and s represent average numbers of residues occurring in a block of residues; p and s are each individually selected such that each pendent polymeric segment has a formula weight of at least 250.

18. The pigment dispersion of claim 17 wherein G is a residue of at least one monomer selected from the group consisting of (i) oxirane functional monomer reacted with a carboxylic acid selected from the group consisting of aromatic carboxylic acids, polycyclicaromatic carboxylic acids, aliphatic carboxylic acids having from 6 to 20 carbon atoms and mixtures thereof, (ii) alkyl (meth)acrylates having from 6 to 20 carbon atoms in the alkyl group and (iii) mixtures of (i) and (ii); and M is a residue of at least one alkyl (meth)acrylate having from 1 to 4 carbon atoms in the alkyl group.

19. The pigment dispersion of claim 18 wherein said oxirane functional monomer is selected from the group consisting of glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof; said carboxylic acid is selected from the group consisting of para-nitrobenzoic acid, hexanoic acid, 2-ethyl hexanoic acid, decanoic acid, undecanoic acid and mixtures thereof; and M is a residue of a monomer selected from the group consisting of methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate and mixtures thereof.

20. The pigment dispersion of claim 17 wherein T is derived from a dehalogenation post-reaction.

21. The pigment dispersion of claim 20 wherein said dehalogenation post-reaction comprises contacting said pigment dispersant with a limited radically polymerizable ethylenically unsaturated compound.

22. The pigment dispersion of claim 21 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

23. The pigment dispersion of claim 22 wherein said limited radically polymerizable ethylenically unsaturated compound is selected from the group consisting of 1,1-diphenylethylene, alpha-methyl styrene and combinations thereof.

24. The pigment dispersion of claim 23 wherein s is from 0 to 20, and p is from 1 to 20.

25. The pigment dispersion of claim 17 wherein M is a hydrophilic residue containing nonionic moieties, ionic moieties and combinations thereof.

* * * * *